(12) United States Patent
Park

(10) Patent No.: US 8,151,947 B2
(45) Date of Patent: Apr. 10, 2012

(54) SINGLE MOTOR ELECTRONIC CONTROLLED WEDGE BRAKE SYSTEM

(75) Inventor: Dongil Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1226 days.

(21) Appl. No.: 11/865,146

(22) Filed: Oct. 1, 2007

(65) Prior Publication Data

US 2008/0314694 A1 Dec. 25, 2008

(30) Foreign Application Priority Data

Jun. 20, 2007 (KR) .................. 10-2007-0060362

(51) Int. Cl.
 *F16D 55/16* (2006.01)
(52) U.S. Cl. ............... 188/72.7; 188/71.7; 188/70 B
(58) Field of Classification Search ............. 188/71.1, 188/71.7, 72.2, 72.3, 72.7, 72.8, 70 B, 162, 188/265
See application file for complete search history.

(56) References Cited

U.S. PATENT DOCUMENTS

| | | | | |
|---|---|---|---|---|
| 4,553,643 | A * | 11/1985 | Wilcox | 188/71.9 |
| 6,938,737 | B2 * | 9/2005 | Hartsock | 188/72.2 |
| 6,978,868 | B2 | 12/2005 | Schautt | |
| 7,258,206 | B2 * | 8/2007 | Severinsson | 188/72.7 |
| 7,347,304 | B2 * | 3/2008 | Nilsson et al. | 188/158 |
| 2003/0201417 | A1 | 10/2003 | Ahn | |
| 2004/0262101 | A1 * | 12/2004 | Baumann et al. | 188/79.51 |
| 2005/0167212 | A1 * | 8/2005 | Pascucci et al. | 188/72.2 |
| 2007/0114843 | A1 * | 5/2007 | Kawahara et al. | 303/122 |
| 2007/0227837 | A1 * | 10/2007 | Barbosa et al. | 188/72.7 |
| 2008/0210498 | A1 * | 9/2008 | Baumgartner et al. | 188/72.2 |
| 2008/0264737 | A1 * | 10/2008 | Baumgartner | 188/72.4 |
| 2008/0314695 | A1 * | 12/2008 | Kim | 188/72.7 |
| 2009/0065311 | A1 * | 3/2009 | Kim | 188/72.7 |
| 2009/0071769 | A1 * | 3/2009 | Cheon | 188/72.7 |
| 2009/0101453 | A1 * | 4/2009 | Baier-Welt et al. | 188/72.7 |

* cited by examiner

*Primary Examiner* — Bradley King
*Assistant Examiner* — Thomas Irvin
(74) *Attorney, Agent, or Firm* — Greenblum & Bernstein P.L.C.

(57) ABSTRACT

The present invention provides a single motor electronic controlled wedge brake system that can achieve parking brake, frictional correction of pads, and fail safe as well as travel brake through the drive control using a single motor. Accordingly, it is possible to achieve a simple configuration of the electronic controlled wedge brake system, reduce manufacturing cost, and facilitate control.

A single motor electronic controlled wedge brake system of the invention includes: a mounting plate that is fastened to a carrier movably in the pressing direction of a disc rotor; a movable wedge that is supported by the base wedge that is movably installed to the mounting plate and contacts inner/outer pads to the disc rotor by a motor in braking; a correcting wedge that is in contact with a fixed wedge fixed to the mounting plate and supports the rear side of the base wedge; and an adjusting unit that includes a pinion nut that movably supports the correcting wedge, selectively applies reaction force to the correcting wedge, and corrects a gap when the inner/outer pads are worn by cooperation with the movable wedge.

11 Claims, 13 Drawing Sheets

SINGLE MOTOR ELECTRONIC CONTROLLED WEDGE BRAKE SYSTEM

CROSS-REFERENCE TO RELATED APPLICATIONS

The present application is based on, and claims priority from, Korean Application Serial Number 10-2007-0060362, filed on Jun. 20, 2007, the disclosure of which is hereby incorporated by reference herein in its entirety.

FIELD OF THE INVENTION

The present invention relates to a single motor electronic controlled wedge brake system, and more particularly, to a single motor electronic controlled wedge brake system that can achieve parking brake, frictional correction of pads, and fail safe as well as travel brake through the drive control using a single motor.

BACKGROUND OF THE INVENTION

Recently, an electronic controlled wedge brakes that generates braking force against disc rotors using the pressing force by wedges through drive control of a motor have been developed. These electronic controlled wedge brake systems in the related art each include two separate motors of one motor for travel brake and another motor for parking brake, frictional correction of pads, and fail safe.

Therefore, since the electronic controlled wedge brake systems each includes two motors, the configuration was complicated, manufacturing cost was correspondingly raised, and it was difficult to separately control two motors.

SUMMARY OF THE INVENTION

Embodiments of the present invention help overcome the drawbacks of the electronic controlled wedge brake systems and achieve a simple configuration of the electronic controlled wedge brake system, reduce manufacturing cost, and facilitate control by achieving parking brake, frictional correction of pads, and fail safe as well as travel brake through the drive control using a single motor.

Embodiments of the present invention provide a single motor electronic controlled wedge brake system including a mounting plate, a base wedge, a movable wedge, a correcting wedge, an adjusting unit, a mechanical reaction mechanism, and an electrical reaction mechanism. The mounting plate is fastened to a carrier movably in the pressing direction of a disc rotor. The base wedge is movably installed to the mounting plate. The movable wedge is supported by the base wedge through a roller cage and contacts inner/outer pads to the disc rotor by a motor in braking. The correcting wedge is in contact with a fixed wedge fixed to the mounting plate movably in the pressing direction of the disc rotor and supports the rear side of the base wedge. The adjusting unit includes a pinion nut that axially moves with engagement with a lead screw to movably support the correcting wedge, selectively applies reaction force to the correcting wedge, and corrects a gap between the inner/outer pads that are worn and the disc rotor by cooperation with the movable wedge. The mechanical reaction mechanism selectively restricts movement of pinion nut by cooperation with the movable wedge. The electrical reaction mechanism selectively restricts the movement of pinion nut on the basis of the traveling condition of a vehicle.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
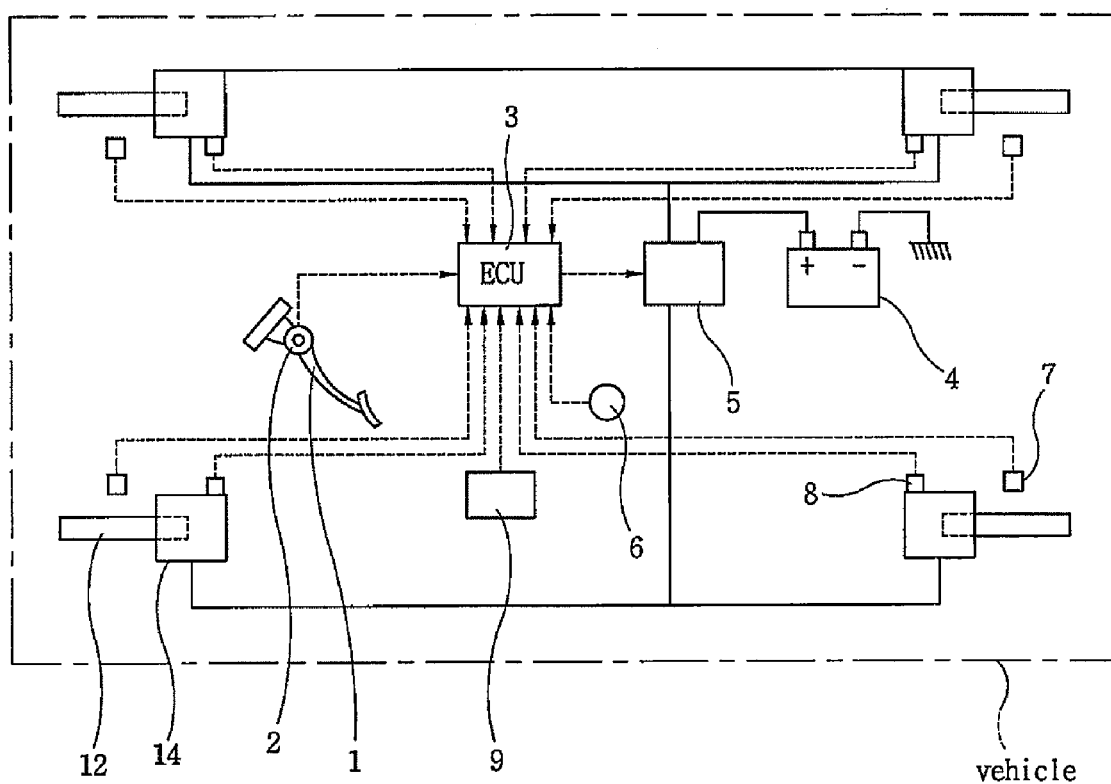
FIG. 1 is a schematic view illustrating a brake system of a vehicle equipped with a single motor electronic controlled wedge brake system according to an embodiment of the invention.
Figure 2:
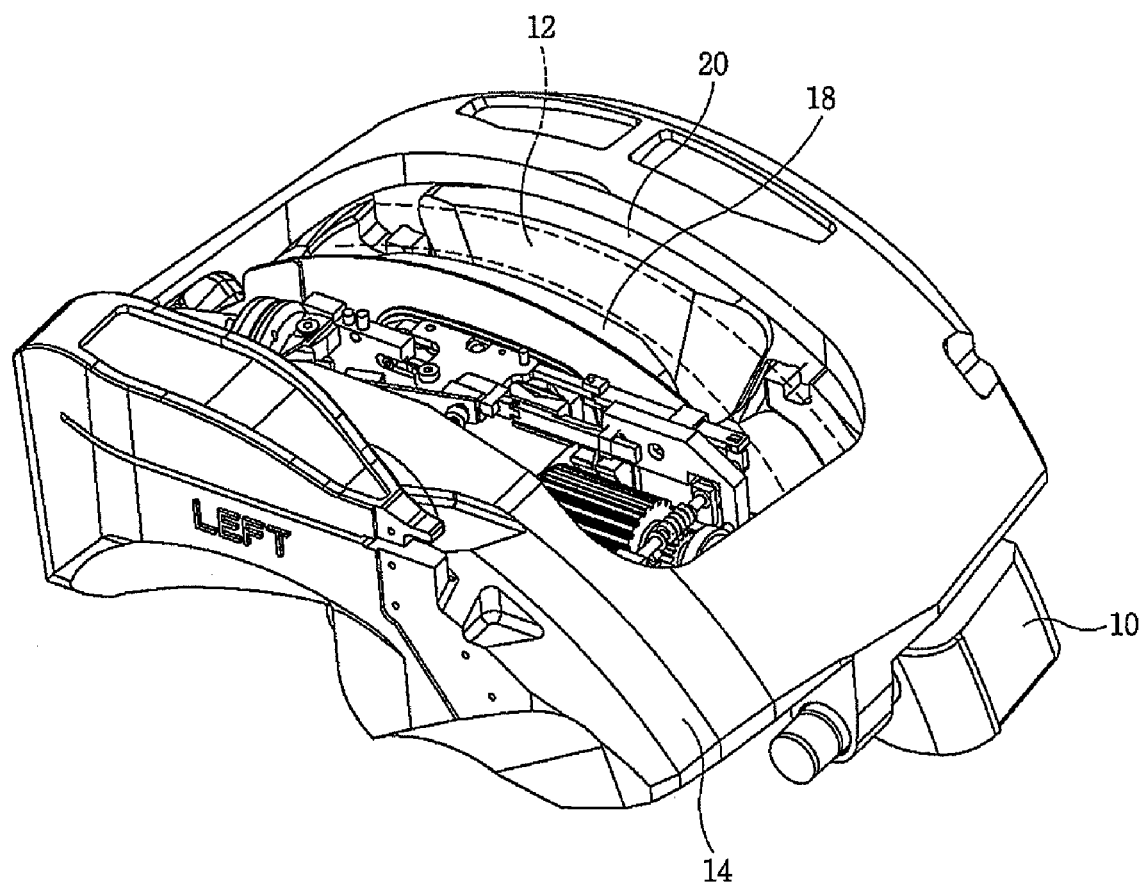
FIG. 2 is a perspective view showing the configuration of a single motor electronic controlled wedge brake system according to an embodiment of the invention.
Figure 3:
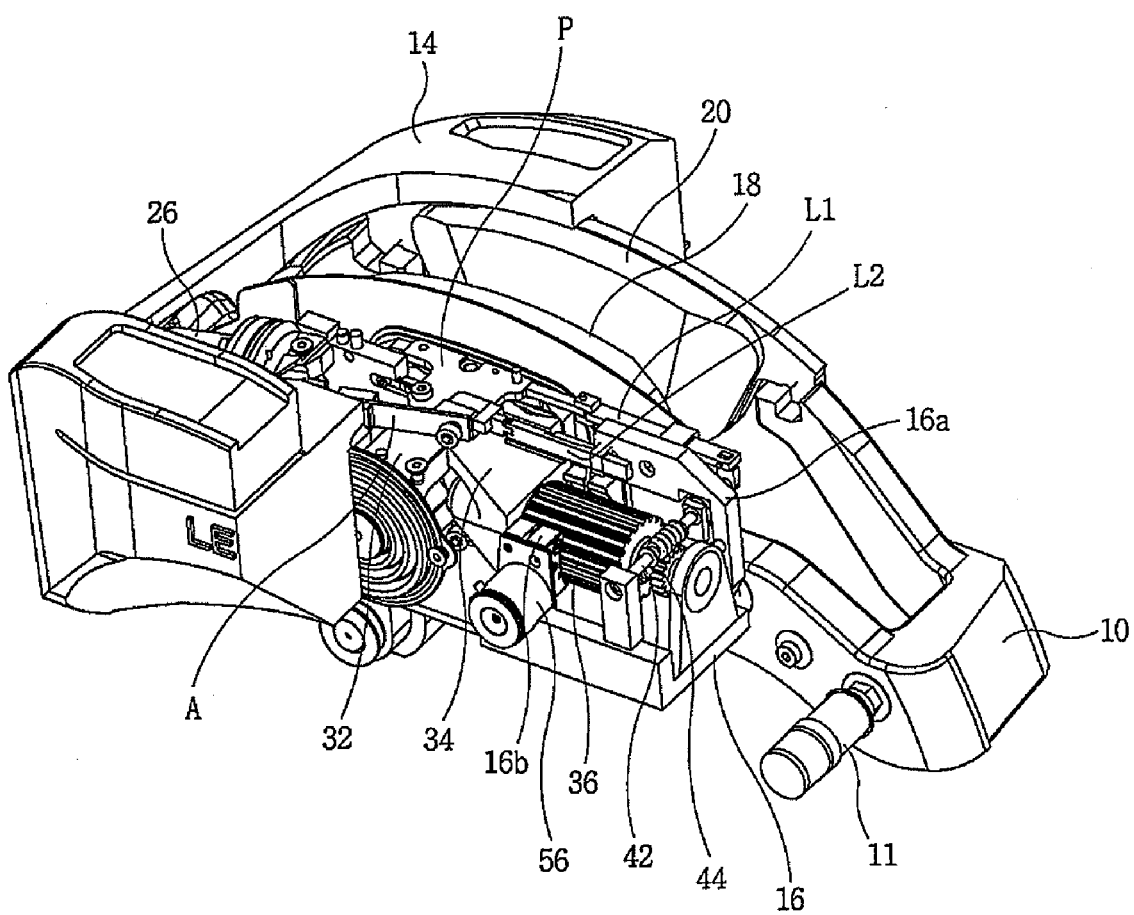
FIG. 3 is a view showing the internal configuration of the single motor electronic controlled wedge brake system of FIG. 2.
Figure 4:
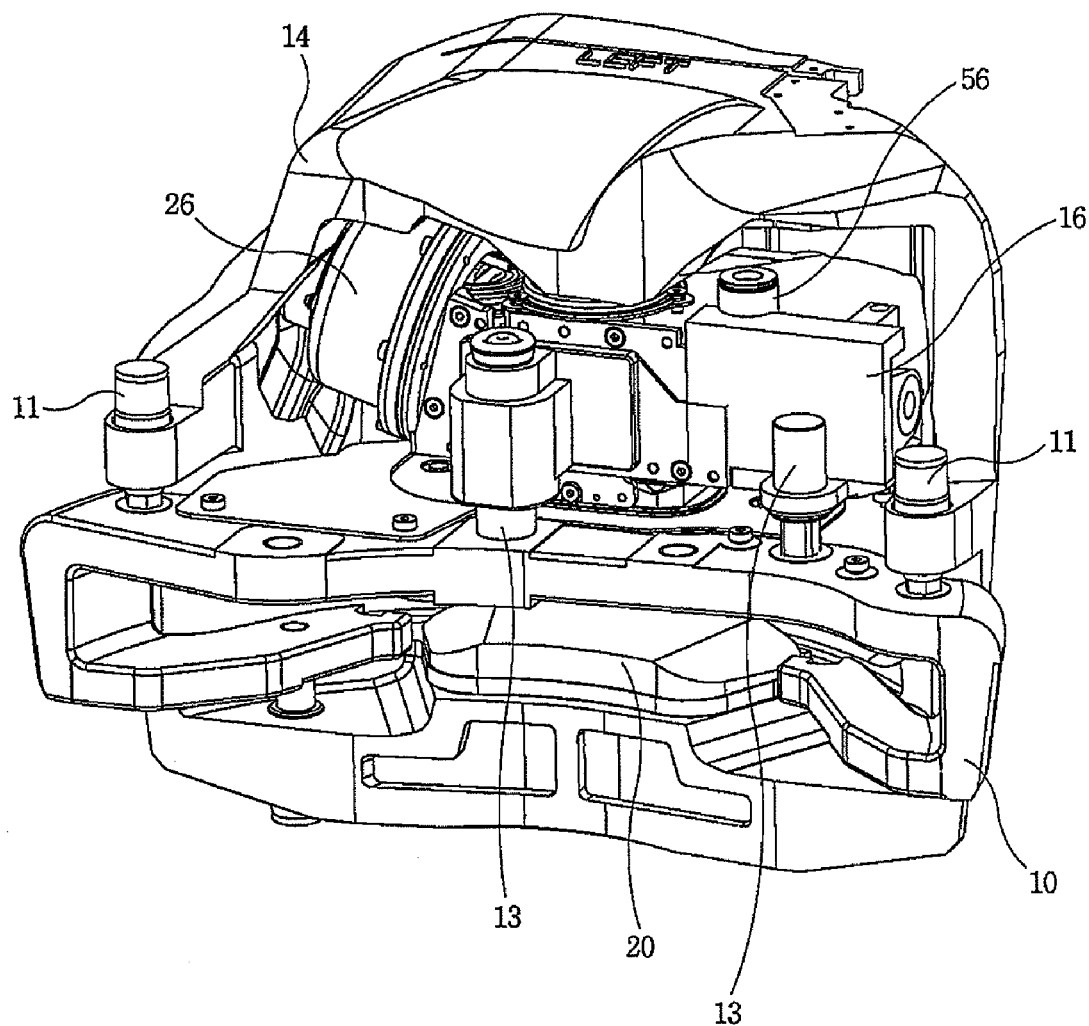
FIG. 4 is a view showing the bottom of the single motor electronic controlled wedge brake system of FIG. 2.
Figure 5:
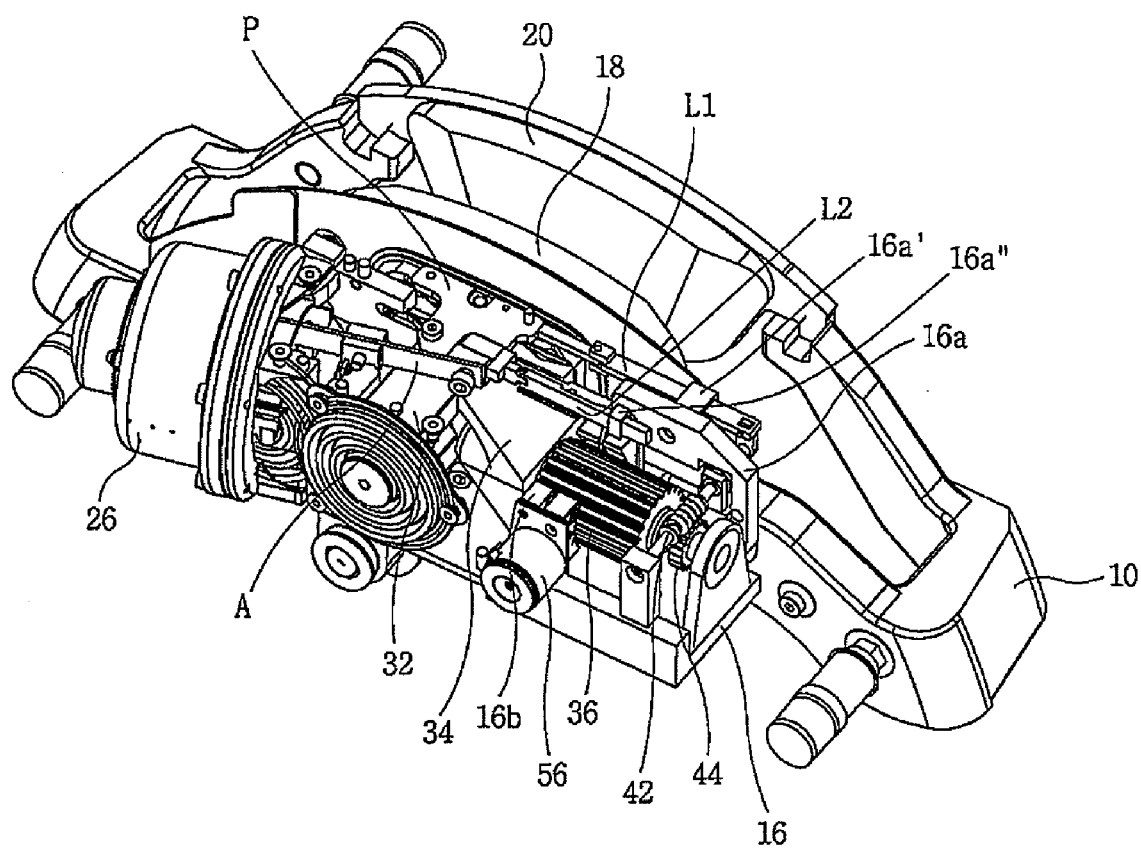
FIG. 5 is a view showing the single motor electronic controlled wedge brake system, with a caliper housing removed, of FIG. 2.
Figure 6:
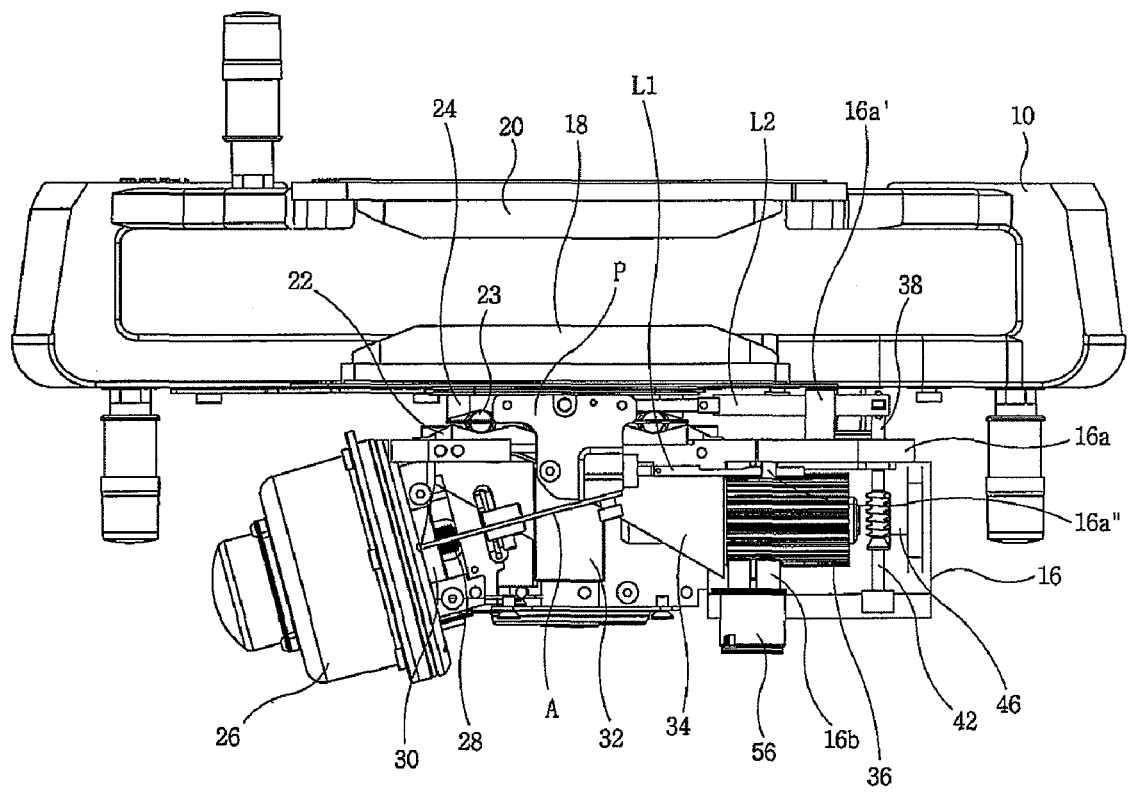
FIG. 6 is a plan view of FIG. 5.
Figure 7:
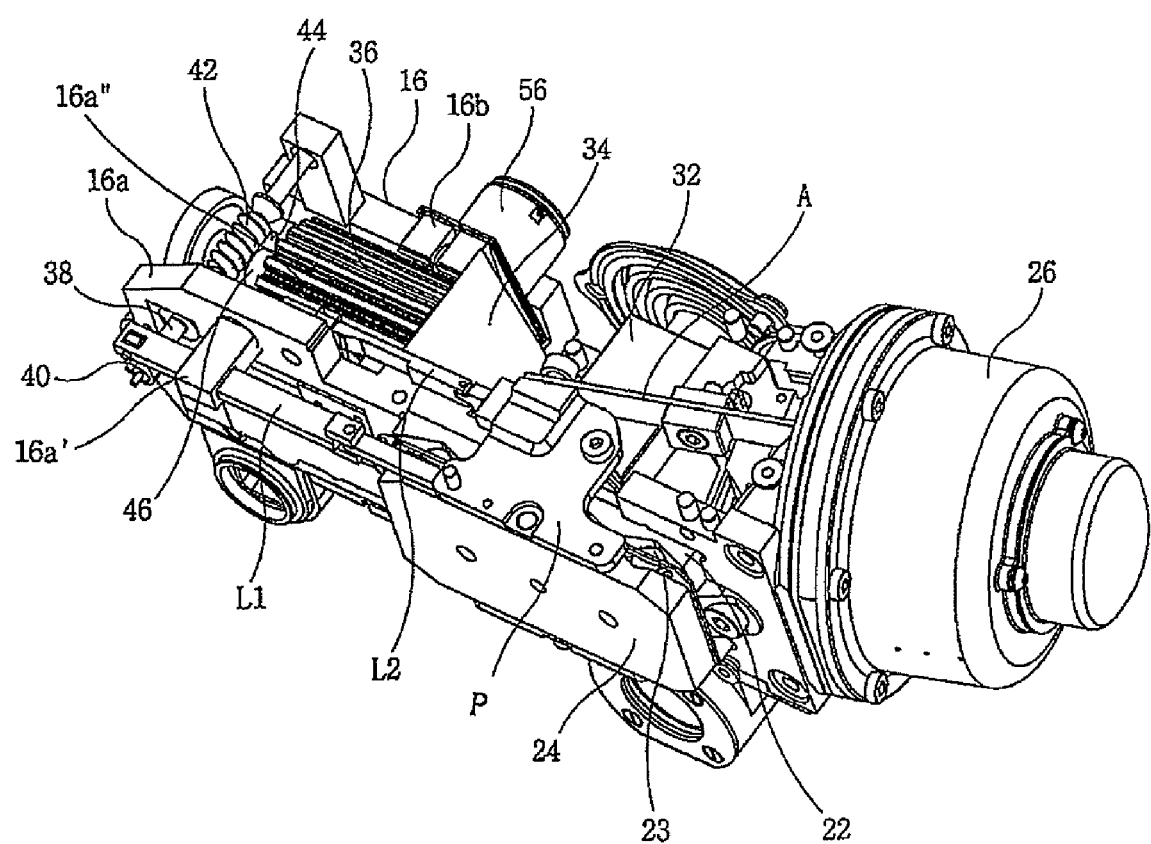
FIG. 7 is a rear perspective view of FIG. 6.
Figure 8:
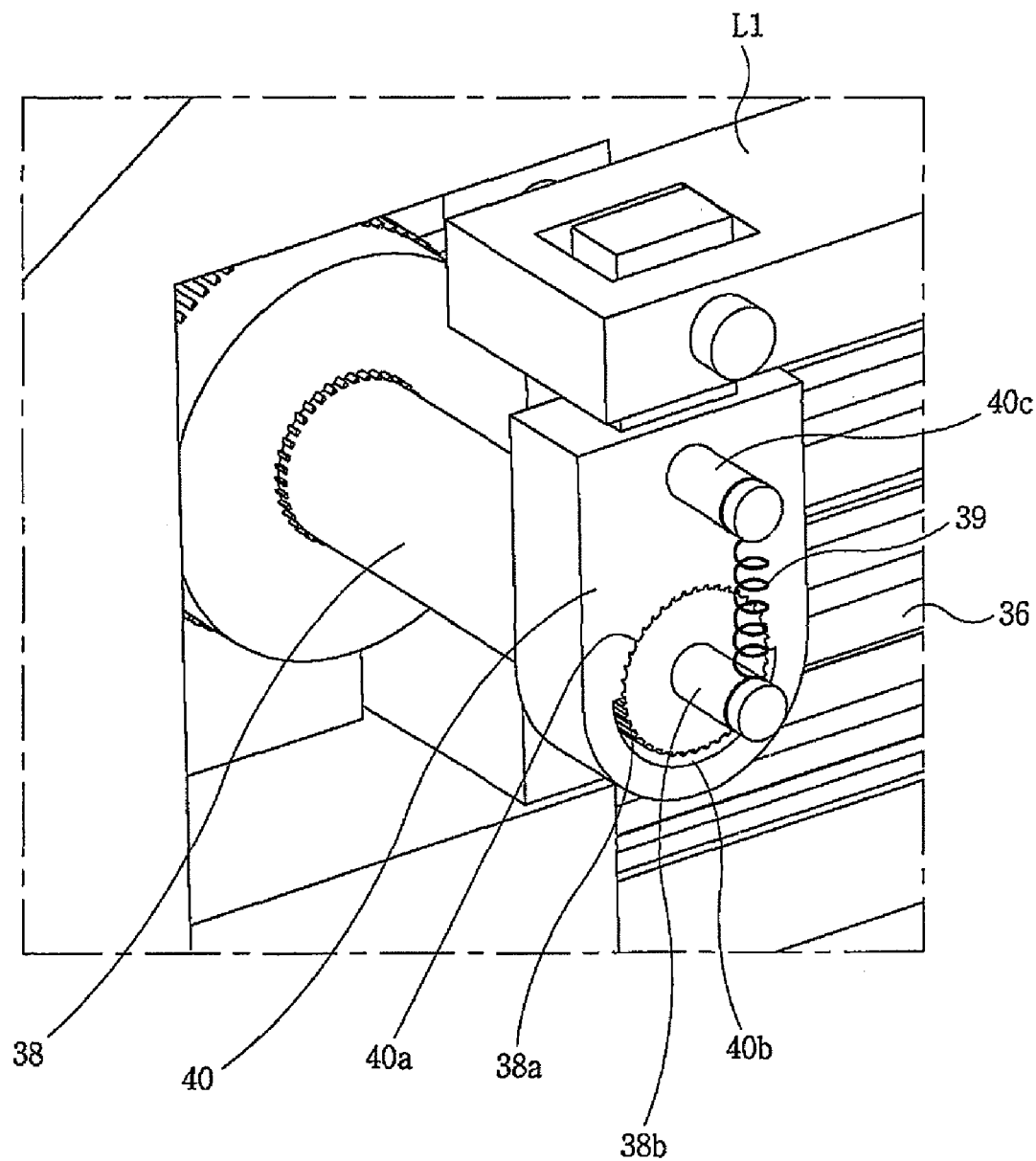
FIGS. 8 to 13 are enlarged views of the main parts of the single motor electronic controlled wedge brake system.
Figure 9:
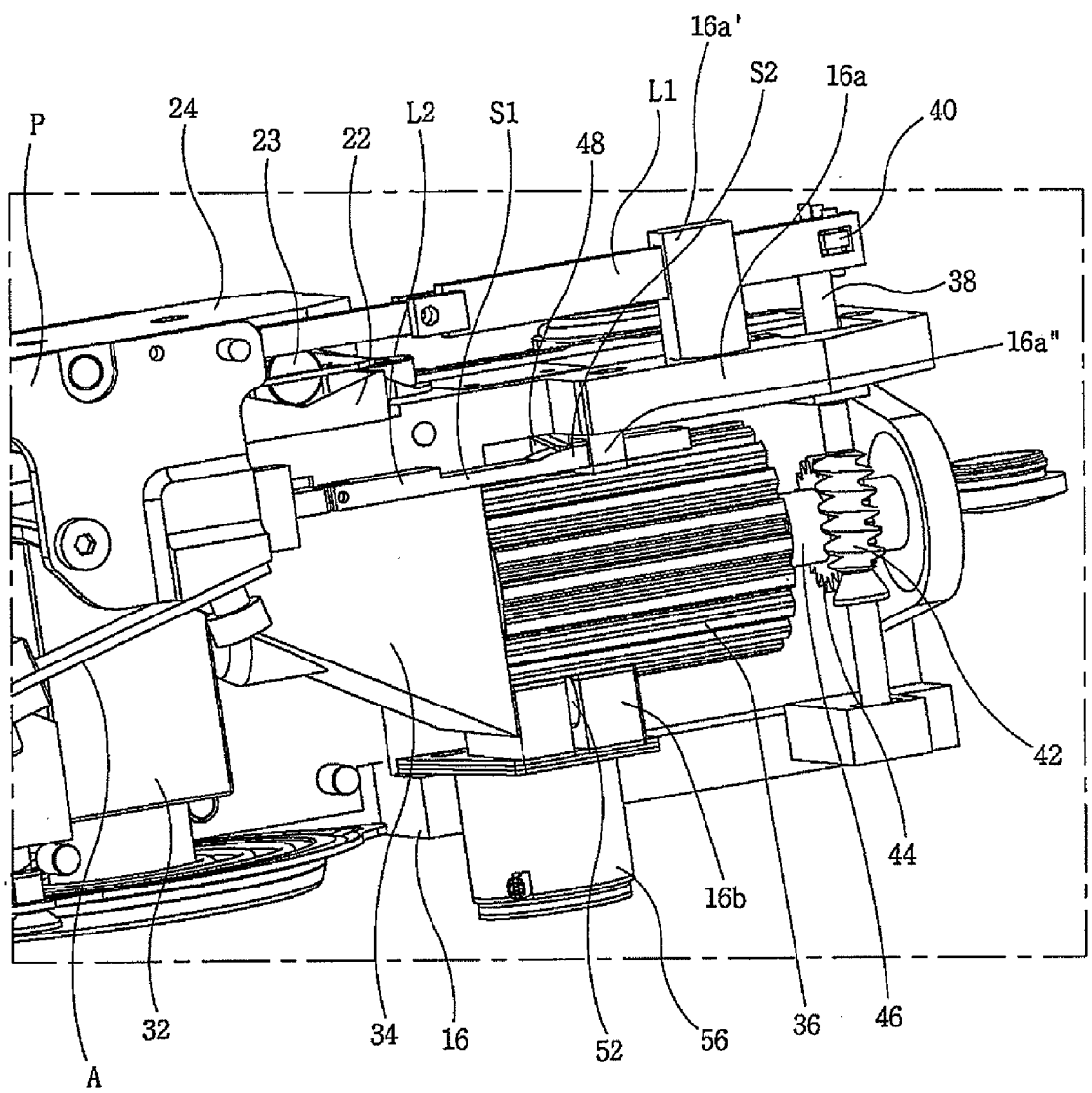
Figure 10:
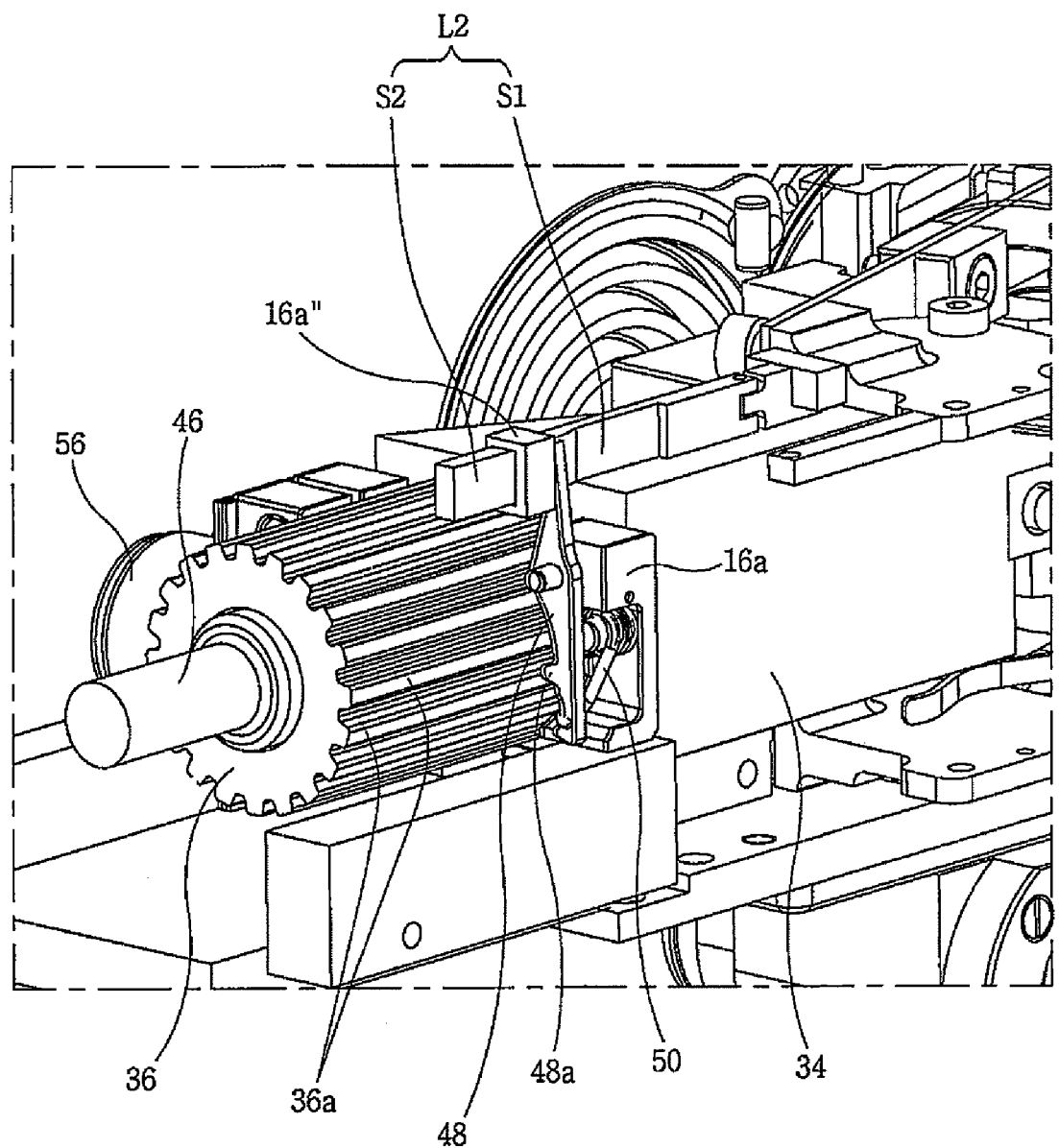
Figure 11:
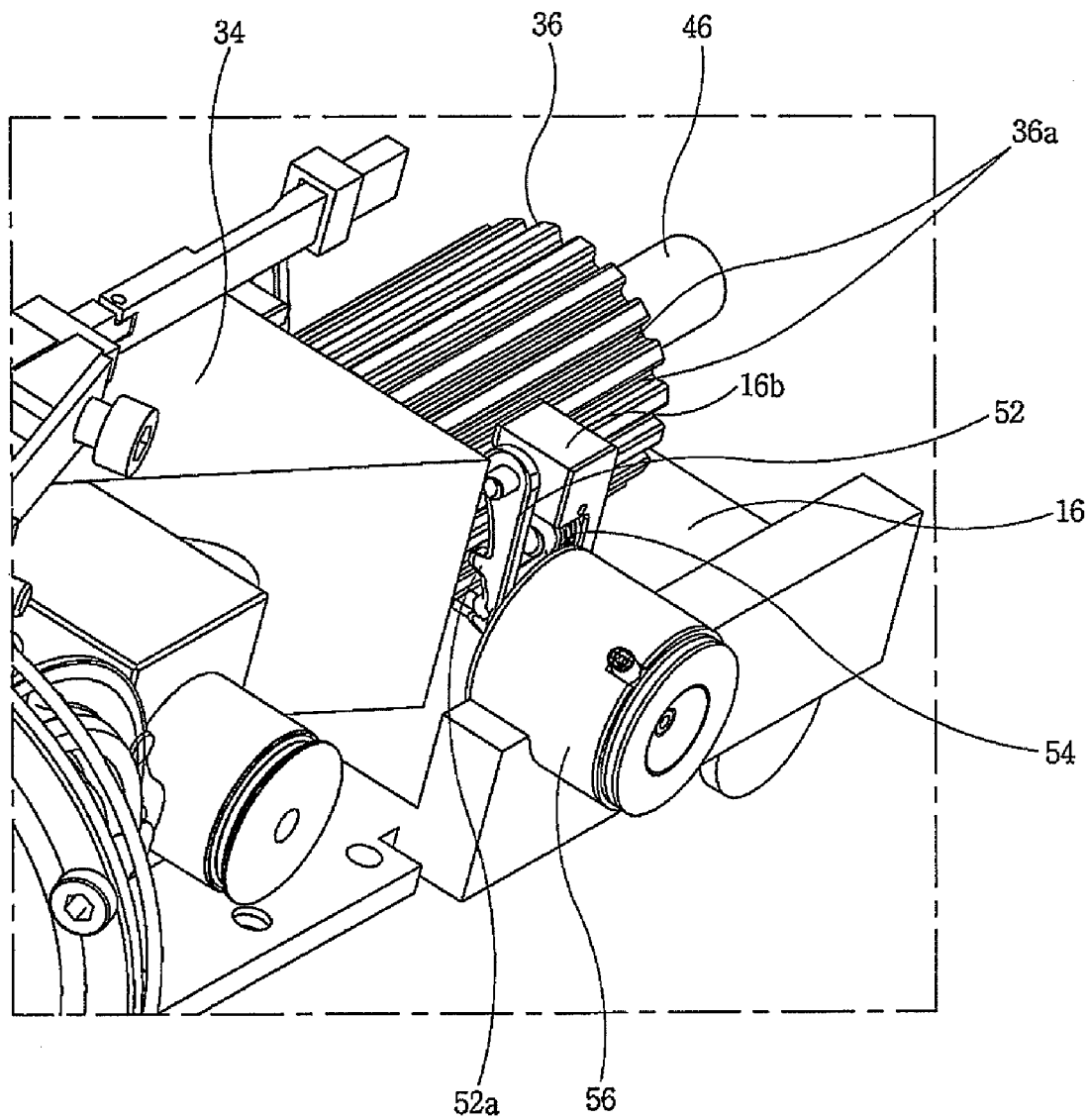
Figure 12:
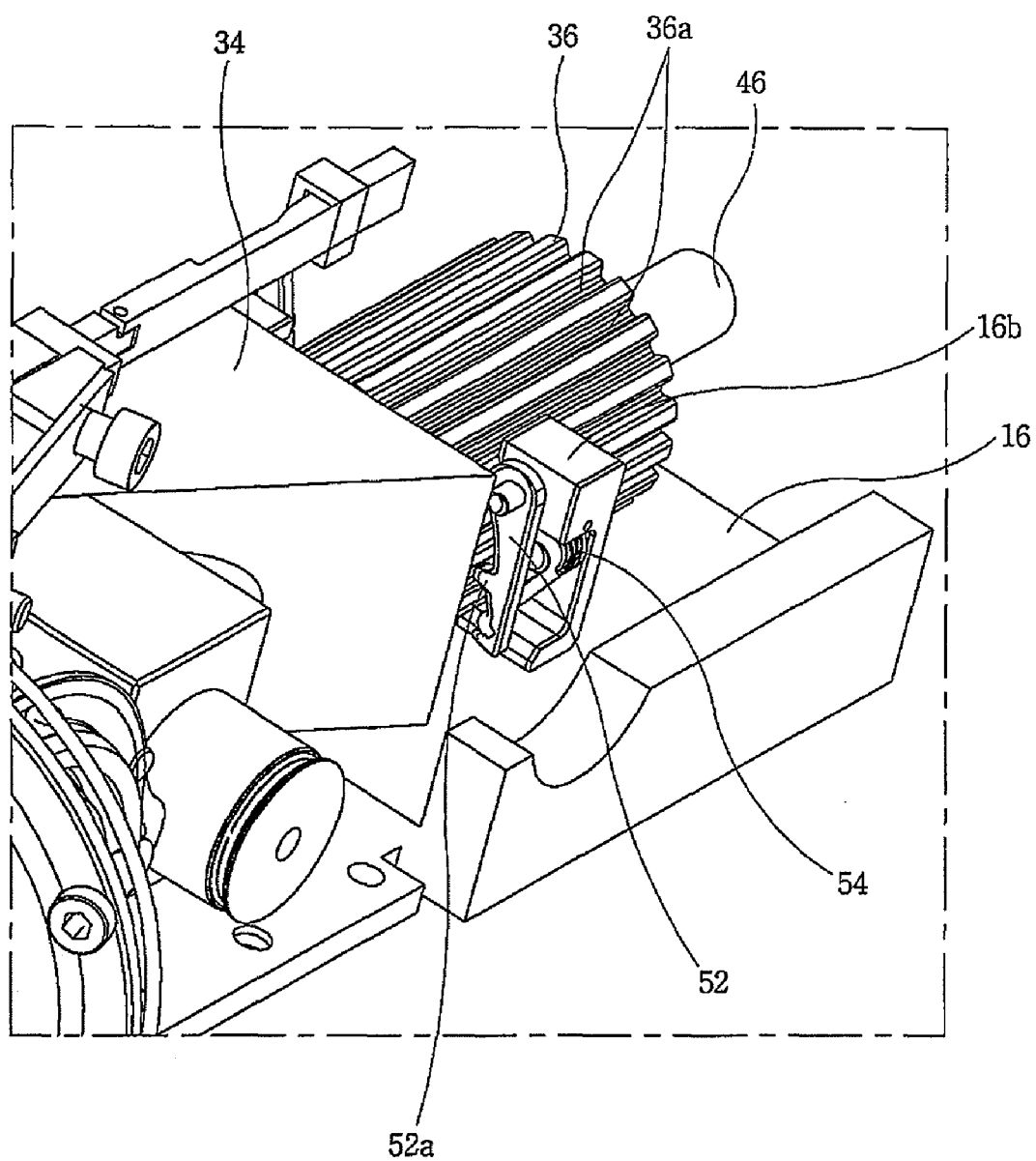
Figure 13:
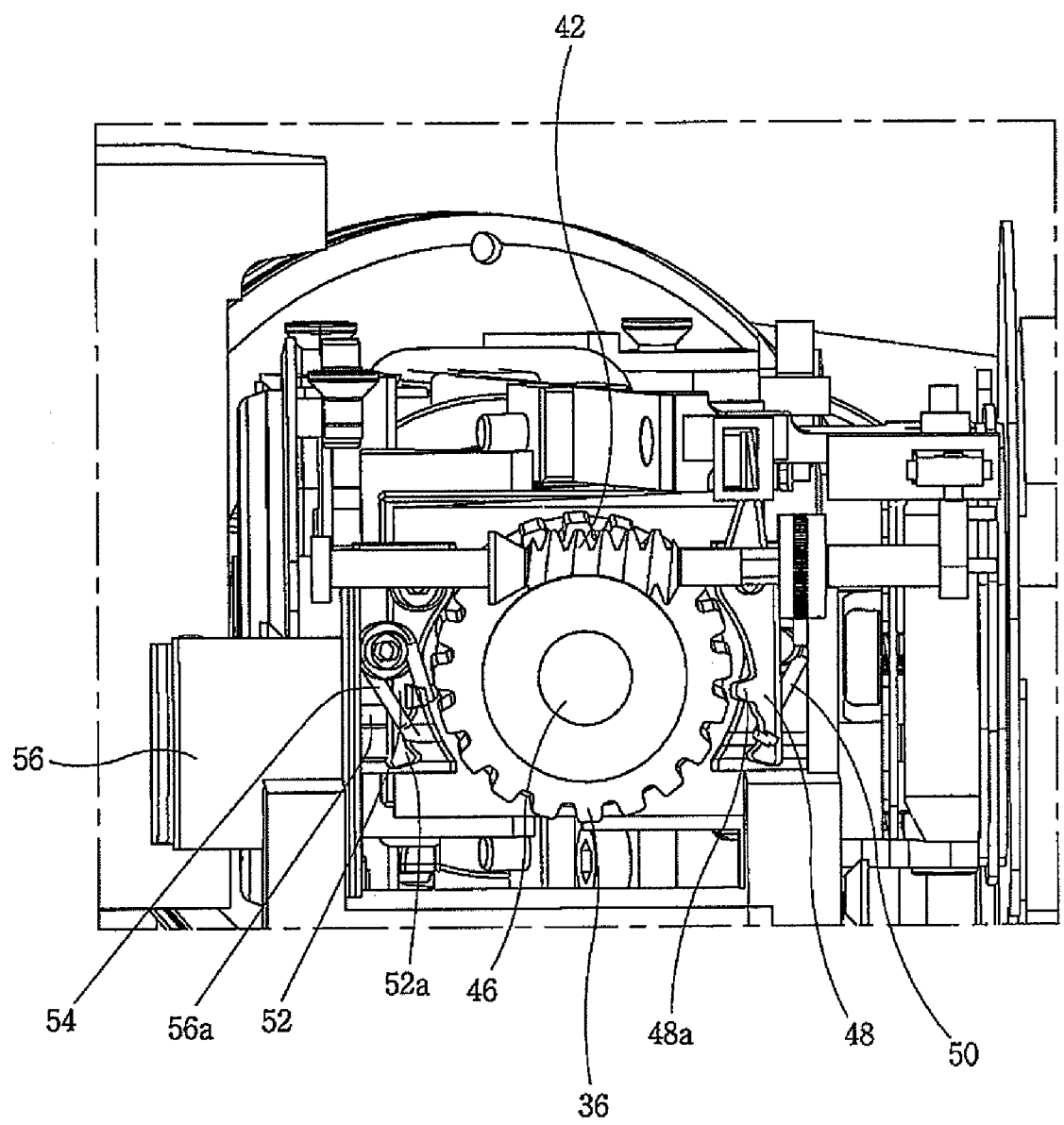

As illustrated in the figures, a brake pedal 1 has a brake sensor 2 that detects the magnitude of the pressing force of a driver and a control unit 3 outputs control signals to a brake mechanism provided to each wheel using input signals from brake sensors 2.

In this configuration, control unit 3 adjusts the power supplied to the brake mechanisms by controlling a power control unit 5 connected with a battery 4.

Further, control unit 3 detects starting on/off of a vehicle through a starting switch 6, rotational speeds of wheels in real time through a wheel speed sensor 7 provided to each wheel, abnormal operations from load changes in wheel jamming through a load sensor 8 provided in the brake mechanisms. Further, control unit 3 stabilizes the operational posture of a vehicle by detecting changes in the operational posture through a yaw-rate sensor 9 and appropriately controlling the brake mechanism.

The brake mechanism includes a carrier 10, a disc rotor 12, a caliper housing 14, a mounting plate 16, an inner pad 18, and an outer pad 20.

Carrier 10 is firmly supported by a component, such as a knuckle, in the suspension system of a vehicle, disc rotor 12 is mounted adjacent to carrier 10 on the wheel, caliper housing 14 is fastened to carrier 10 by a plurality of first guide pins 11 such that it is movable in the pressing direction, the thickness direction of disc rotor 12, mounting plate 16 is fastened to carrier 10 by a plurality of second guide pins 13 such that it is movable in the pressing direction, the thickness direction of disc rotor 12, and inner pad 18 and outer pad 20 are disposed inside/outside disc rotor 12, respectively.

A base wedge 22 is mounted on mounting plate 16 movably in the pressing direction of disc rotor 12. Supported by base wedge 22 through a roller cage 23, a movable wedge 24 is actuated to press inner pad 18 by a motor 26 that is controlled to normally/reversely rotate by control unit 3 in braking, thereby contacting inner/outer pads 18, 20 to disc rotor 12.

Threads and bottoms are formed on the surfaces facing each other of base wedge 22 and movable wedge 24, roller cage 23 retains a plurality of rollers that are in rolling contact with the bottoms between the threads, and movable wedge 24 is pressed by roller cage 23 in braking according to changes in the relative position between base wedge 22 and movable wedge 24 and correspondingly presses inner pad 18, in which base wedge 22 supports movable wedge 24.

The brake mechanism includes motor 26 controlled by control unit 3, a lead screw 28 mounted on the rotary shaft of motor 26, and a ball nut 30 engaged with lead screw 28. An end of a connecting arm A is connected to ball nut 30 and the other end is connected with a movable plate P connected to movable wedge 24.

Provided in the brake mechanism to correct the amount of friction of the pads, an adjusting unit includes a fixed wedge 32 fixed to mounting plate 16, a correcting wedge 34 contacting with fixed wedge 32 movably in the pressing direction of disc rotor 12 and supporting the rear side of base wedge 22, a pinion nut 36 axially moving by engaging a lead screw 46 with correcting wedge 34 movably supported, a first power conversion mechanism converting a linear motion into one-directional rotation through connection with movable wedge 24, a torsion beam 38 receiving rotational force that is transmitted from the first power converting portion, and a second power conversion mechanism converting the rotational force transmitted from torsion beam 38 into a linear motion of pinion nut 36.

Pinion nut 36 selectively applies reaction force to correcting wedge 34 and corrects a gap between worn inner/outer pads 18, 20 and disc rotor 12 through cooperation with movable wedge 24.

The first power conversion mechanism is composed of a first link member L1 operating together with movable wedge 24 and a pivot arm 40 of which an end is hinged to the front end of first link member L1 and the other end has a through hole with a female ratchet 40a on the inside to engage a male ratchet 38a formed on an end of torsion beam 38.

First link member L1 is connected to movable plate P, and supported and guided by a first bracket 16a' formed to a first intermediate wall 16a vertically standing from mounting plate 16. Accordingly, first link member L1 operates with movable wedge 24 in braking.

A space 40b for disengagement of male ratchet 38a and female ratchet 40a is formed in the through hole of pivot arm 40 and a compressive spring 39 connects a first protruding boss 40c formed on pivot arm 40 and a second protruding boss 38b formed at the end of torsion beam 38. Therefore, rotational force is transmitted in only one direction between male ratchet 38a and female ratchet 40a.

The second power converting portion is composed of a worm gear 42 axially connected with torsion beam 38 with male ratchet 38a on the outside that is engaged with female ratchet 40a and a worm wheel 44 fitted around lead screw 46 engaged with pinion nut 36 and engaged with worm gear 42.

The brake mechanism further includes a mechanical reaction force mechanism that selectively restricts pinion nut 36 through cooperation with movable wedge 24, an electrical reaction force mechanism that selectively restricts pinion nut 36 depending on operational condition of a vehicle, a fail safe detector that detects wheel jamming condition, and a starting detector that detects whether the starter is on. According to this configuration, when the fail safe detector detects wheel jamming, the electrical reaction force mechanism is stopped, and when the starting detector detects that the starter is off, the electrical reaction force mechanism is stopped and the mechanical reaction force mechanism starts by reversing motor 26.

As worm wheel 44 rotates, pinion nut 36 that is limited in rotation by the mechanical reaction force mechanism or the electrical reaction mechanism moves without rotating in the axial direction of lead screw 46. However, pinion nut 36 that is released from the rotational restriction by the mechanical reaction force mechanism or the electrical reaction force mechanism axially moves, rotating about lead screw 46.

In order to achieve the above-mentioned operation, the mechanical reaction force mechanism is composed of second link member L2 that operates with movable wedge 24 and has a stepped portion S1 and an end portion S2 integrally formed, a first lever 48 with the center hinged to first intermediate wall 16a, an end selectively contacting stepped portion S1 or end portion S2, and the other end having a first poll 48a that is selectively engaged with teeth 36a integrally extending longitudinally around the outside of pinion nut 36, and a return spring 50 that is disposed between first intermediate wall 16a and first lever 48 and applies pivot force to first lever 48 in the separating direction of first poll 48a from teeth 36a, such that first poll 48a is engaged with teeth 36a of pinion nut 36 only when first lever 48 is in contact with end portion S2.

Second link member L2 is connected at one end to movable plate P that connects movable wedge 24 with connecting arm A connected with ball nut 30 that linearly moves with lead screw 28 of motor 26, second link member L2 is also connected at one end to movable plate P and guided by second bracket 16a" provided to first intermediate wall 16a vertically standing from mounting plate 16.

Accordingly, as first lever 48 contacts end portion S2 while pivoting on the hinged point and engaging teeth 36a of first poll 48a, pinion nut 36 is limited in rotation and linearly moves in the axial direction of lead screw 46 when lead screw 46 rotates.

On the other hand, the electrical reaction force mechanism is composed of a second lever 52 with an end hinged to a second intermediate wall 16b vertically standing from mounting plate 16 and the other end having a second poll 52a that is selectively engaged with teeth 36a integrally extending longitudinally around the outside of pinion nut 36, a second return spring 54 that is disposed between second intermediate wall 16b and second lever 52 and applies pivot force to second lever 52 in the separating direction of second poll 52a from teeth 36a, and a solenoid 56 that has a plunger that contacts the free end of second lever 52 and engages second poll 52a with teeth 36a against the elastic force of second return spring 54 when power is supplied.

Accordingly, when power is supplied to solenoid 56, second lever 52 pivots on the hinged point by the pressing force of plunger 56a, second poll 52a is correspondingly engaged with teeth 36a, and the rotation of pinion nut 36 is and pinion nut 36 linearly moves in the axial direction of lead screw 46 when lead screw 46 rotates.

The operation of electronic wedge brake system with a single motor according to an embodiment of the invention is now described in detail.

First, in braking, control nut 3 controls the normal/reverse rotation of motor 26 on the basis of changes in the amount of pressing force by operation of brake pedal 1 that are received from brake sensor 2.

The normal/reverse rotation of motor 26 is transmitted to lead screw 28, and the corresponding normal/inverse rotation of lead screw 28 is converted into axial motion of ball nut 30 engaged with lead screw 28. The axial motion of ball nut 30 is transmitted through connecting arm A to movable wedge 24 and inner pad 18 is pressed by reaction force between base wedge 22, roller cage 23, and movable wedge 24.

Control unit 3 controls forward/backward movement of movable wedge 24 on the basis of rotational direction of disc rotor 12 that depends on the travel direction of a vehicle.

When the vehicle traveling forward is braked, movable wedge 24 contacts inner/outer pads 18, 20 to disc rotor 12 by repeatedly reciprocating forward and backward in the normal rotational direction of disc rotor 12.

On the other hand, when the vehicle traveling backward is braked, movable wedge 24 contacts inner/outer pads 18, 20 to disc rotor 12 by repeatedly reciprocating forward and backward in the reverse rotational direction of disc rotor 12.

Further, the above braking is achieved by restricting the rotation of pinion nut 36 by the electrical reaction force mechanism. In detail, when the vehicle is in travel, solenoid 56 is shifted to On-state, and plunger 56a of solenoid 56 presses second lever 52 and consequently poll 52a is engaged with teeth 36a of pinion nut 36. As a result, pinion nut 36 is restricted in rotation and applies force to correcting wedge 34 to support the rear side of base wedge 22 and movable wedge 24 presses inner pad 18 against disc rotor 12 by the force transmitted through base wedge 22.

In the above braking, the first power converting mechanism that operated with movable wedge 24 converts a linear motion into a rotary motion, the torque transmitted from the first power converting mechanism is inputted into torsion beam 38, and the torque inputted in torsion beam 38 is converted into a linear motion about pinion nut 36 by the second power converting mechanism.

Specifically, in the first power converting mechanism, pivot arm 40 pivots by first link member L1 actuated by movable wedge 24, female ratchet 40a of pivot arm 40 transmits pivot motion of pivot arm 40 to torsion beam 38 in only one direction by one-directional engagement with male ratchet 38a at the end of torsion beam 38, and the rotational force transmitted to torsion beam 38 is transmitted into axial rotational force to lead screw 46 through the engagement between worm gear 42 and worm wheel 44.

In this operation, when inner/outer pads 18, 20 are worn, separation correcting wedge 34 from the rear side of base wedge 22 appears in the pressing direction of disc rotor 12, the separation of correcting wedge 34 is corrected by axial movement of pinion nut 36 by rotation of lead screw 46, and an appropriate gap is maintained between inner/outer pads 18, 20 and disc rotor 12.

When starting switch 6 is turned off for parking, control unit 3 reverses motor 26, and by the reverse rotation of motor 26, the mechanical reaction force mechanism to prevent base wedge 22 from being pushed backward by restricting rotation of pinion nut 36. As a result, the braking force that is generated by the reverse rotation of motor 26 and exerted by pressing movable wedge 24 against inner pad 18 is maintained.

In detail, when motor 26 is reversed, end portion S2 of second link member L2 presses an end of first lever 48 and poll 48a at the other end is correspondingly engaged with teeth 36a of pinion nut 36. Accordingly, pinion nut 36 of which rotation is restricted applies reaction force to correcting wedge 34 to support the rear side of base wedge 22, which allows movable wedge 24 to continuously press inner pad 18 against disc rotor 12 by the reaction force from base wedge 22.

Further, when the fail safe is caused by wheel jamming, control unit 3 detects the wheel jamming condition through load sensor 8 and turns off solenoid 56. Accordingly, the electrical reaction force mechanism does not restrict the rotation of pinion nut 36; therefore, base wedge 22 can freely move backward, that is, the support against base wedge 22 from correcting wedge 34 is removed and the wheel jamming between disc rotor 12 and inner/outer pads 18, 20 can be released.

Specifically, solenoid 56 is turned off when a fail safe appears, poll 52a of second lever 52 is disengaged from teeth 36a of pinion nut 36 and the rotational restriction of pinion nut 36 is released. Accordingly, the support from correcting wedge 34 to base wedge 22 is removed; therefore, the restriction of movable wedge 24 is released and it is possible to prevent wheel jamming.

As described above, according to an electronic wedge brake system with a single motor of the invention, it is possible to achieve braking in travel and parking by drive control using a single motor, correct a gap between worn pads and a disc rotor through mechanical cooperation, and release wheel jamming due to a fail safe through mechanical cooperation.

Further, since an electronic wedge brake system includes a single motor, it is possible to simplify the configuration, reduce manufacturing cost, and achieve easy control.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A single motor electronic controlled wedge brake system, comprising:
    a mounting plate that is fastened to a carrier and is movable in a pressing direction of a disc rotor;
    a base wedge that is movably installed on the mounting plate;
    a movable wedge that is supported by the base wedge through a roller cage and is configured to be actuated by a motor to cause the inner and outer pads to contact the disc rotor during braking;
    a correcting wedge that is in contact with a fixed wedge fixed to the mounting plate so as to be movable in the pressing direction of the disc rotor, and wherein the correcting wedge supports the rear side of the base wedge;
    an adjusting unit that includes a pinion nut that axially moves with engagement with a lead screw to movably support the correcting wedge, selectively applies reaction force to the correcting wedge, and corrects a gap between the inner and outer pads that are worn and the disc rotor by cooperation with the movable wedge;
    a mechanical reaction mechanism that selectively restricts movement of pinion nut by cooperation with the movable wedge;
    an electrical reaction mechanism that selectively restricts the movement of pinion nut on the basis of the traveling condition of a vehicle;
    a fail safe detector that detects restriction of wheels, wherein when the fail safe detector detects the restriction of wheels, the electrical reaction mechanism is stopped;
    a starting detector that detects whether a vehicle starts, wherein when the start detector detects that starting is off, the electrical reaction mechanism is stopped and the motor is reversed to starts the mechanical reaction mechanism; and
    the adjusting unit includes a first power converting mechanism that converts a linear motion into a one-directional rotary motion by cooperation with the movable wedge, a torsion beam that receives the torque transmitted from the first power converting mechanism, and a second power converting mechanism that converts the rotational force transmitted from the torsion beam into the linear motion of pinion nut.

2. The electronic controlled wedge brake system as defined in claim 1, wherein the fail safe detector includes a load sensor that is provided in a caliper housing and detects changes in load while the wheels are restricted.

3. The electronic controlled wedge brake system as defined in claim 1, wherein the starting detector includes a starting switch that detects starting on/off of a vehicle.

4. The electronic controlled wedge brake system as defined in claim 1, wherein the first power converting mechanism includes a first link member that operates with the movable wedge and a pivot arm with an end hinged to an end of the first link member and the other end having a through hole with a female ratchet formed around the inside that is engaged with a male ratchet formed around the outside of an end of the torsion beam.

5. The electronic controlled wedge brake system as defined in claim 4, wherein the female ratchet has a space to disengage from the male ratchet and a compressive spring connects a first protruding boss formed on pivot arm and a second protruding boss formed at an end of torsion beam.

6. The electronic controlled wedge brake system as defined in claim 4, wherein an end of the first link member is connected to a movable plate that connects the movable wedge with a connecting arm connected with a ball nut that is linearly moved by cooperation with a lead screw of the motor.

7. The electronic controlled wedge brake system as defined in claim 4, wherein the first link member is guided by a first bracket formed to a first intermediate wall vertically standing from the mounting plate.

8. The electronic controlled wedge brake system as defined in claim 1, wherein the second power converting mechanism includes a worm gear of which the shaft is connected with torsion beam and a worm wheel that is fitted around the lead screw engaged with pinion nut and engaged with the worm gear.

9. The electronic controlled wedge brake system as defined in claim 6, wherein the mechanical reaction mechanism includes: the second link member that operates with the movable wedge and has a stepped portion and an end portion integrally formed; a first lever with the center hinged to the first intermediate wall, an end selectively contacting the stepped portion or the end portion, and the other end having a first poll that is selectively engaged with the teeth integrally extending longitudinally around the outside of pinion nut; and a return spring that is disposed between the first intermediate wall and the first lever and applies a pivot force to the first lever in the separating direction of the first poll from the teeth, such that the first poll is engaged with the teeth only when the first lever is in contact with the end portion.

10. The electronic controlled wedge brake system as defined in claim 9, wherein the second link member is connected to the movable plate at an end and guided by a second bracket formed to the first intermediate wall vertically standing from the mounting plate.

11. The electronic controlled wedge brake system as defined in claim 9, wherein the electrical reaction force mechanism includes: a second lever with an end hinged to a second intermediate wall vertically standing from the mounting plate and the other end having a second poll that is selectively engaged with the teeth of pinion nut; a second return spring that is disposed between the second intermediate wall and the second lever and applies a pivot force to the second lever in the separating direction of the second poll from the teeth; and a solenoid that has a plunger that contacts the free end of the second lever and engages the second poll with the teeth against the elastic force of the second return spring when power is supplied.

* * * * *